(12) United States Patent
De Filippis (10) Patent No.: US 10,288,078 B2
(45) Date of Patent: May 14, 2019

(54) ELECTRICAL MACHINE, FAN, VENTILATOR

(71) Applicant: SPAL AUTOMOTIVE S.r.l., Correggio (Reggio Emilia) (IT)

(72) Inventor: Pietro De Filippis, Varazze (IT)

(73) Assignee: SPAL AUTOMOTIVE S.R.L., Correggio (IT)

( * ) Notice: Subject to any disclaimer, the term of this patent is extended or adjusted under 35 U.S.C. 154(b) by 139 days.

(21) Appl. No.: 14/892,603

(22) PCT Filed: May 26, 2014

(86) PCT No.: PCT/IB2014/061727
§ 371 (c)(1),
(2) Date: Nov. 20, 2015

(87) PCT Pub. No.: WO2014/191902
PCT Pub. Date: Dec. 4, 2014

(65) Prior Publication Data
US 2016/0146210 A1    May 26, 2016

(30) Foreign Application Priority Data

May 29, 2013    (IT) .............................. BO2013A0272

(51) Int. Cl.
*F04D 25/08*    (2006.01)
*H02K 5/20*    (2006.01)
(Continued)

(52) U.S. Cl.
CPC ......... *F04D 25/082* (2013.01); *F04D 19/002* (2013.01); *F04D 25/0606* (2013.01);
(Continued)

(58) Field of Classification Search
CPC .. F04D 25/082; F04D 25/0613; F04D 29/329; F04D 29/584; H02K 5/20;
(Continued)

(56) References Cited

U.S. PATENT DOCUMENTS 6,211,587 B1    4/2001    Enomoto et al.
6,379,116 B1    4/2002    Tai
(Continued)

FOREIGN PATENT DOCUMENTS

CN    101790830 A    7/2010
CN    101809831 A    8/2010
(Continued)

OTHER PUBLICATIONS

International Search Report and Written Opinion dated Oct. 27, 2015 from counterpart PCT App No. PCT/IB2014/061727.
(Continued)

*Primary Examiner* — Kenneth J Hansen
(74) *Attorney, Agent, or Firm* — Shuttleworth & Ingersoll, PLC; Timothy J. Klima (57) ABSTRACT

An axial flow fan having an axis of rotation includes a central hub including a base wall and a lateral wall which projects from the base wall to form a cup-shaped structure, a plurality of blades each fixed to the central hub and including a leading edge and a trailing edge, a plurality of extractors of a fluid which are associated with the base wall for conveying air from the inside of the cup-shaped structure to the outside of the cup-shaped structure through the base wall.

14 Claims, 5 Drawing Sheets

(51) Int. Cl.
*H02K 7/14* (2006.01)
*H02K 9/22* (2006.01)
*F04D 29/32* (2006.01)
*F04D 29/58* (2006.01)
*F04D 19/00* (2006.01)
*F04D 25/06* (2006.01)

(52) U.S. Cl.
CPC ....... *F04D 29/329* (2013.01); *F04D 29/5806* (2013.01); *H02K 5/20* (2013.01); *H02K 7/14* (2013.01); *H02K 9/22* (2013.01)

(58) Field of Classification Search
CPC .. H02K 5/18; H02K 1/32; H02K 9/00; H02K 9/04; H02K 9/14
USPC ...................................... 310/62, 63
See application file for complete search history.

(56) References Cited

U.S. PATENT DOCUMENTS

| 8,022,590 | B2 | 9/2011 | DeFilippis |
| 8,362,662 | B2 | 1/2013 | DeFilippis |
| 8,896,168 | B2 | 11/2014 | DeFilippis |
| 2008/0130169 | A1 | 6/2008 | Kitamura |
| 2009/0196744 | A1 | 8/2009 | Yu et al. |
| 2010/0096938 | A1 | 4/2010 | Yano et al. |
| 2012/0049668 | A1* | 3/2012 | Garriga .................. H02K 5/20 310/59 |

FOREIGN PATENT DOCUMENTS

| JP | 2006177325 A | 7/2006 | |
| JP | 201098816 | 4/2010 | |
| JP | 2010536313 A | 11/2010 | |
| WO | WO 2008146155 A2 * | 12/2008 | .......... F04D 25/082 |
| WO | WO2008146155 A2 | 12/2008 | |
| WO | WO 2009019562 A2 * | 2/2009 | ............. H02K 1/185 |
| WO | WO2009019562 A2 | 2/2009 | |

OTHER PUBLICATIONS

Japanese Office dated Jan. 30, 2018 from counterpart Japanese App No. 2016516278.
Chinese Office Action dated Jun. 27, 2017 from counterpart Chinese App No. 201480030987.
Chinese Search Report dated Jun. 19, 2017 from counterpart Chinese App No. 201480030987.

\* cited by examiner

ELECTRICAL MACHINE, FAN, VENTILATOR

This application is the National Phase of International Application PCT/IB2014/061727 filed May 26, 2014 which designated the U.S.

This application claims priority to Italian Patent Application No. BO2013A000272 filed May 29, 2013, which application is incorporated by reference herein.

TECHNICAL FIELD

This invention relates to an electrical machine, in particular a rotary electric motor, an axial fan and an electric ventilator of the type comprising the electric motor and the axial fan driven by the electric motor.

The reference technical sector is that of electric ventilators for automotive applications, intended for carrying heat away from radiant masses and the like.

BACKGROUND ART

In general, a reference prior art type of electric motor comprises a casing having inside a stator of the wound type, rigidly constrained to the casing, and a rotor, for example with permanent magnets, rotatably constrained to the casing.

An electronic module or control electronics, connected to the stator, is inserted in the casing for supplying power to the stator.

A cap closes the casing to form a closed container from which connection terminals protrude for the power supply of the control electronics.

The electrical machines used as a reference for this invention are in particular of the brushless enclosed type also known as the sealed type, that is, sealed electrical machines.

It is known that the windings of an electrical machine, whether they are stator or rotor windings, are made using a plurality of coils of conducting material, usually copper, made of a conducting wire wound around two or more pole shoes of the stator and/or the rotor of the electrical machine. The winding, through which electricity flows, is isolated from the pole shoes, which are made of ferromagnetic material. For that purpose, a layer of electrically insulating material is interposed between the winding and the corresponding pole shoe on which it is wound.

An electric current which may even have a high nominal value passes through the winding and that causes heating phenomena due to the Joule effect which extend over the entire dimensions of the winding and in the zones of the electrical machine adjacent to it.

In particular, it has been found that said heating phenomenon causes a deterioration of the conductivity properties of the conducting wire, which consequently produces a greater resistance to the passage of electric current, causing a high and often unacceptable level of energy dissipation.

Moreover, the heating of the winding may cause a rapid deterioration of the insulating characteristics of the above-mentioned layer of electrically insulating material interposed between the winding and the corresponding pole shoe, as well as excessive heating of the electronic module.

That situation is particularly bad in closed type rotary electrical machines, in which the windings are immersed in the container, formed by a casing and cap, which does not have air recirculation.

A solution intended to overcome said difficulty is described in the document WO2009019562 in the name of the same Applicant.

In that solution, the inside of the casing is provided with a plurality of stop portions, in the form of protrusions of a base wall of the casing, against which the stator windings abut, suitably insulated, for more effective heat exchange with the cap.

In the case of high powered motors, at around one kW, the prior art solutions are still not completely satisfactory in terms of dispersing the heat produced in the windings.

DISCLOSURE OF THE INVENTION

In this context, the main aim of this invention is to overcome the above-mentioned disadvantages.

One aim of this invention is to provide an electrical machine in which the cooling of the stator winding is further improved compared with the prior art solutions.

A further aim is to provide an axis fan which contributes to dispersal of the heat produced by the stator windings and transferred to the casing of the electrical machine which drives the self-same fan.

Another aim of this invention is to provide a ventilator which is particularly effective for dispersing the heat produced by operation of the motor.

The technical purpose indicated and the aims specified are substantially achieved by an electrical machine, by a fan and by an electric ventilator according to the present disclosure.

BRIEF DESCRIPTION OF DRAWINGS

Further features and advantages of this invention are more apparent in the detailed description below, with reference to a preferred, non-restricting, embodiment of a ventilator as illustrated in the accompanying drawings, in which.

DETAILED DESCRIPTION OF PREFERRED EMBODIMENTS OF THE INVENTION

Figure 1:
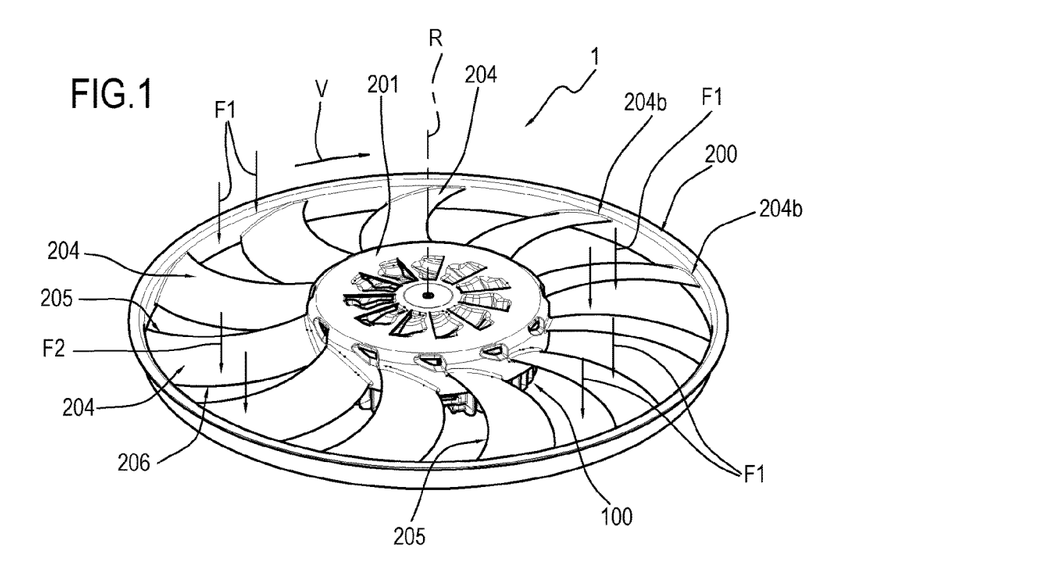
FIG. 1 is a schematic perspective view of an electric ventilator in accordance with this invention.

With reference in particular to FIG. 1, the numeral 1 denotes an electric ventilator according to this invention.

As illustrated, the electric ventilator 1 is of the axial type and has an axis R of rotation.

The electric ventilator 1 comprises an electrical machine 100, that is to say, an electric motor, and a fan 200 driven by the motor 100.

The motor 100 and the fan 200 are described in more detail below only in terms of the technical features necessary for understanding this invention.

Figure 3:
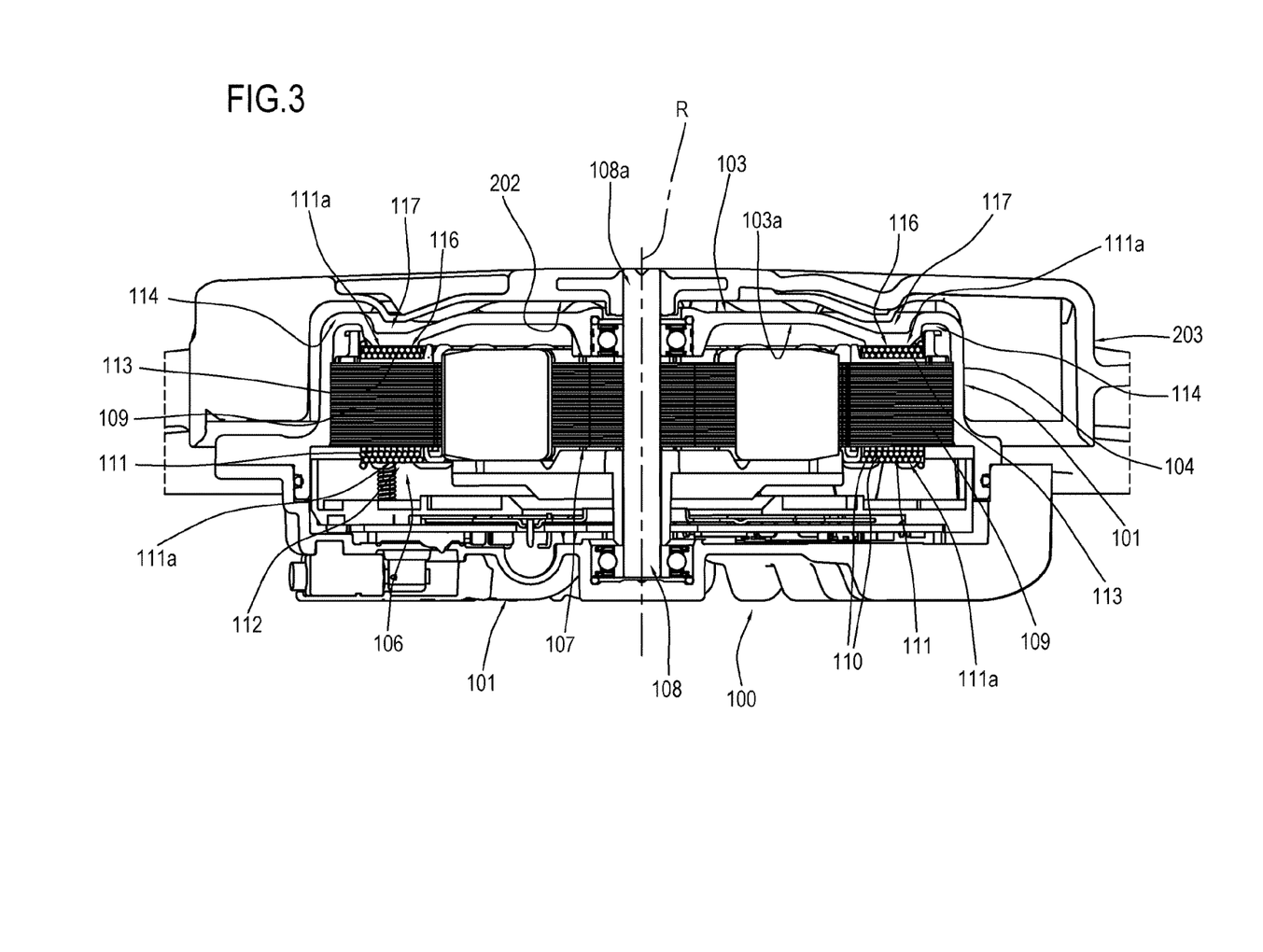
FIG. 3 is a schematic cross-section according to line III-III of the portion of the ventilator of FIG. 2.
Figure 4:
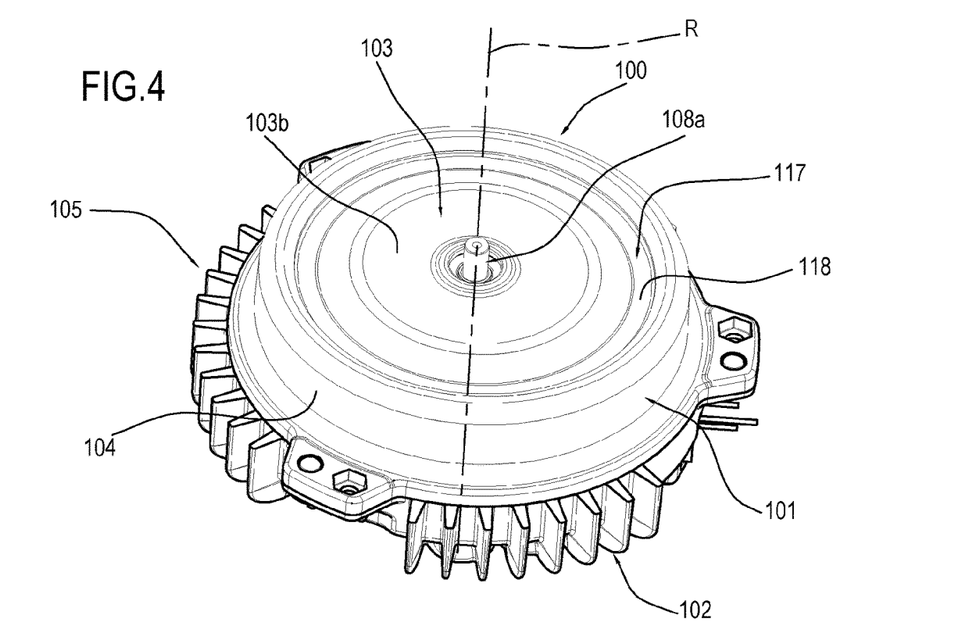
FIG. 4 is a schematic perspective view of the motor of the electric ventilator of FIG. 1.
Figure 5:
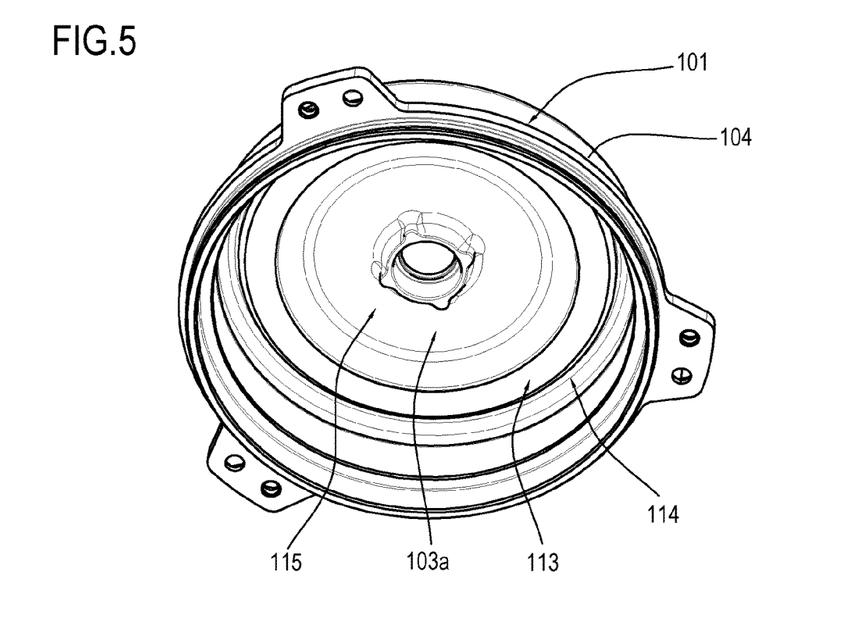
FIG. 5 is a schematic perspective view of the casing of the motor of FIG. 4.

With particular reference to FIGS. 3, 4 and 5, it should be noticed that the electric motor 100, having an axis R of rotation, comprises a casing 101 and a cap 102 which closes the casing 101.

The casing 101 comprises a base wall 103 transversal to the axis R of rotation and a lateral wall 104 which is preferably cylindrical, projecting from the base wall 103.

The casing 101 and the cap 102 are coupled to each other according to a line parallel with the axis R of rotation and, in use, they form a closed container 105 which is preferably of the sealed type.

The motor 100 comprises a stator 106, fixed to the casing 101, and a rotor 107, for example of the type with permanent magnets, rotatably constrained to the container 105.

The rotor 107 comprises a shaft 108 one end 108a of which protrudes from the container 105 and to which the fan 200 is fixed.

In the example illustrated, the shaft 108 protrudes from the base wall 103 of the casing 101.

In that way the base wall 103 abuts and faces an inner face of a base wall of the hub of the axial fan 200 as explained below.

For the sake of a simple description, reference is made to the preferred embodiment in which the base wall 103 facing the inner face of the hub of the fan 200 is a base wall of the casing 103.

In alternative embodiments not illustrated but equivalent, the base wall 103 is a base wall of the cap 102.

The stator 106 comprises a plurality of pole shoes 109 and phase wires 110 which are wound on the pole shoes 109.

The wires 110 which are wound on the pole shoes 109 form a plurality of coils 111 which, in the example illustrated, constitute the stator winding 112.

With reference to FIG. 3, it can be seen how each coil 111 has two end portions 111a which are aligned with each other according to a line parallel with the axis R.

The base wall 103 comprises a projection 113 projecting towards the inside of the casing 101 according to a line parallel with the axis R of rotation.

In other words, the projection 113 extends away from the lying plane of the base wall 103 towards an inner space of the electric motor 100, in particular of the casing 101.

In the preferred embodiment illustrated, the projection 113 is substantially annular and extends about the axis R of rotation.

The projection 113 is concentric with the lateral wall 104 of the casing 101 and delimits, with the lateral wall 104 of the casing 101, an annular channel 114.

As illustrated, the projection 113 delimits, on the inside, a space 115 which is substantially circular and outside the above-mentioned inner channel 114 inside the casing 101.

The projection 113 is preferably part of the casing 101 and in use is formed on an inner face 103a of the base wall 103 facing towards the inside of the container 105.

The coils 111 engage with the projection 113 for heat exchange with the casing 101 by means of the projection 113.

More precisely, the stator 106 is inserted in the casing 101 in such a way that the coils 111 abut against the projection 113.

As illustrated, all of the end portions 111a facing the base wall 103 of the casing 101 engage with the projection 113.

In particular, all of the end portions 111a facing towards the base wall 103 of the casing 101 abut against the projection 113.

To guarantee suitable electrical insulation between the stator winding 112 and the casing 101, the motor 100 comprises electrical insulating means interposed between the winding 112 and the projection 113.

Advantageously, the electrical insulating means can conduct heat in such a way as to optimise the heat exchange between the winding 112 and the casing 101.

Preferably, the insulating means comprise a sheet or a piece 116 of a sheet of Silpad® which guarantees suitable mechanical strength, thermal conductivity and electrical insulation.

Figure 3A:
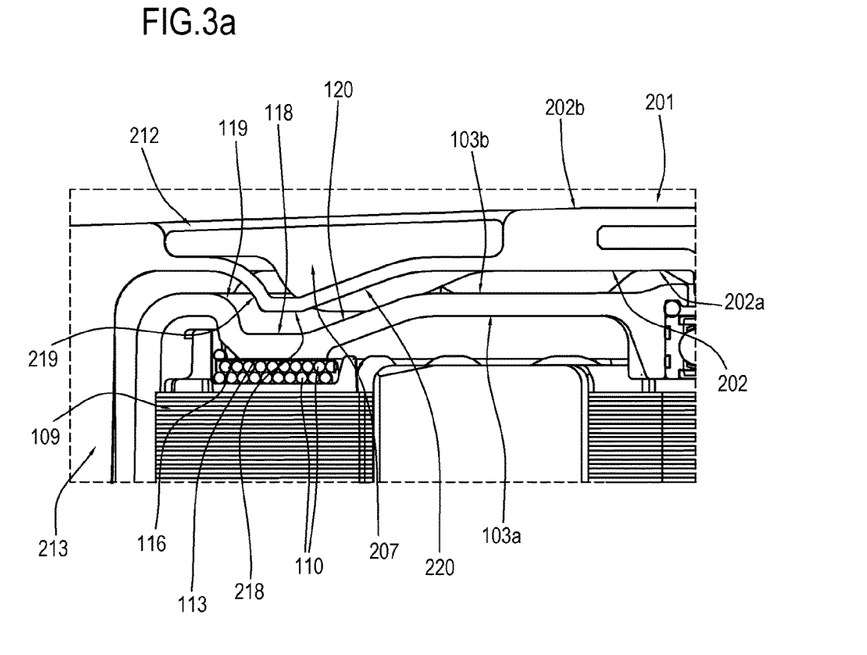
FIG. 3*a* shows an enlarged detail of the cross-section of FIG. 3.

With particular reference to FIGS. 3, 3a and 4, it can be seen how the motor 100, in particular the base wall 103 of the casing 101, comprises, on an outer face 103b of it which is facing towards the outside of the casing 101, a channel 117 for discharging the heat produced in the container 105, in particular by the stator 106.

The channel 117 is preferably annular and is coaxial with the axis R of rotation.

In particular with reference to FIGS. 3 and 3a, it can be seen how the channel 117 is preferably positioned, in the base wall 103, substantially at the projection 113, inside the casing 101.

The projection 113 and the channel 117 are provided in the base wall 103 on opposite sides of the base wall, that is to say, respectively, on the inner face 103a and on the outer face 103b, substantially at the same location as each other.

In that way, most of the heat produced by the stator 106 is transferred to the base wall 103 by means of the projection 113 and from the base wall to the outside of the container 105, in particular into the channel 117, from where it dissipates.

The channel 117 comprises a base wall 118 and is laterally delimited by two lateral walls 119, 120 which are facing one another and preferably connected to the wall 118.

The base wall 118 preferably lies in a plane perpendicular to the axis R of rotation of the motor 100.

In the preferred embodiment illustrated, the wall 119 has a curvilinear profile.

The wall 120 has a straight profile and, in use, has a frustoconical extension.

Looking in more detail at the fan 200, it can be seen how it is preferably of the type made of plastic material and obtained by moulding.

The fan 200 is an axial fan provided for rotating preferably in the direction V of rotation so as to generate a main flow F1 which is directed towards the motor 100.

Figure 6:
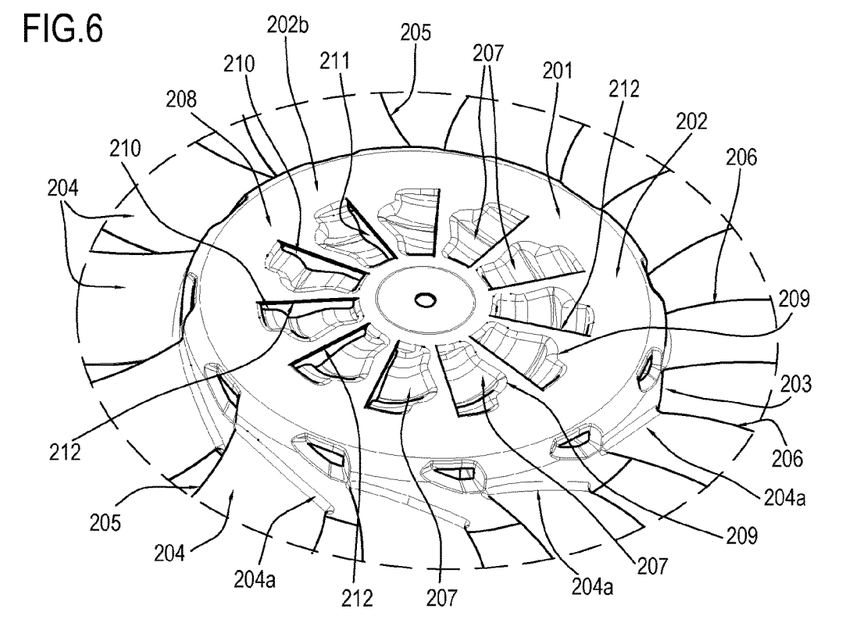
FIG. 6 is a schematic perspective view of the hub of the fan which is part of the ventilator of FIG. 1.

The fan 200 comprises a central hub 201 comprising a base wall 202 having an inner face 202a and an outer face 202b.

The hub 201 comprises a lateral wall 203 which is preferably cylindrical, extending from the base wall 202.

The base wall 202 and the lateral wall 203 are made as a single body and form a cup-shaped structure.

As indicated, the fan 200 is connected to the end 108a of the shaft, in a substantially known way, by means of the base wall 202, preferably in such a that the motor 100 is at least partly inserted in the hub 201.

The fan 200 comprises a plurality of blades 204, each fixed to the hub 201, preferably made in a single body with the hub.

Each blade 204 extends between a first end 204a proximal to the hub 201 and a second end 204b, opposite the first, distal from the hub 201.

Figure 2:
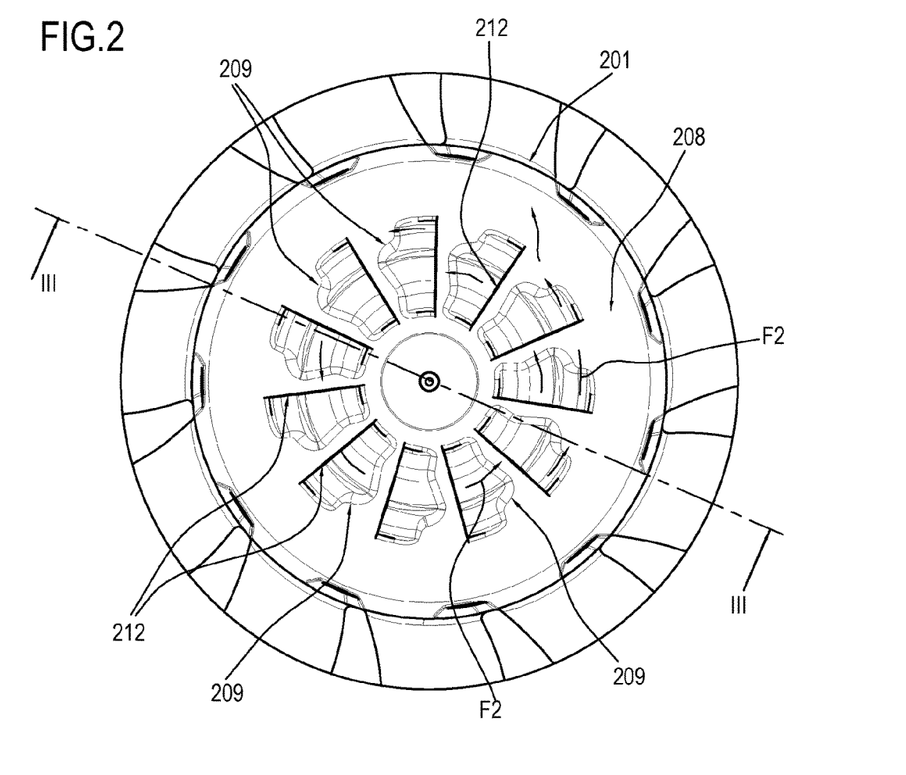
FIG. 2 is a top plan view of a portion of the ventilator of FIG. 1.

Each blade 204 comprises a first lateral profile 205 preferably forming a leading edge of the blade 204, and a second lateral profile 206 preferably forming a respective trailing edge of the blade 204.

The fan 200 comprises fluid conveying means which are associated with the base wall 202 for conveying air from the inside of the cup-shaped structure, that is to say, from the inside of the hub 201, to the outside of the cup-shaped structure, that is to say, to the outside of the hub 201, through the base wall 202.

In use, as is described in more detail below, the conveying means are shaped to take air from the inside of the cup-shaped structure and push it out of said structure.

The conveying means are positioned and shaped, as described below, at the channel 117 outside the base wall 103 for removing, in particular, the heat transferred into the channel 117 from the stator 106 by means of the projection 113.

In the preferred embodiment illustrated, the conveying means comprise a plurality of fluid, in particular air, extractors 207 which are associated with the base wall 202 of the hub 201.

More precisely, the base wall 202 comprises a main portion 208 which is substantially flat and perpendicular to the axis R of rotation of the fan 200.

The extractors 207 are made in a single body with the main portion 208 so that, overall, they form the base wall 202.

The extractors 207 are spaced at equal angles about the axis R and preferably distributed in such a way as to maximise their number in the base wall 202.

Each extractor 207 projects from the main portion 208 of the base wall 202 of the hub 201 towards the inside of the cup-shaped structure of the hub 201.

Each extractor 207 comprises an end edge 209 fixed to the main portion 208 of the base wall 202 and an end profile 210 distanced from the main portion 208 of the base wall 202 of the hub 201 towards the inside of the cup-shaped structure.

Each extractor 207 is advantageously connected to the main portion 208 of the base wall 202 in particular by means of the edge 209.

Figure 7:
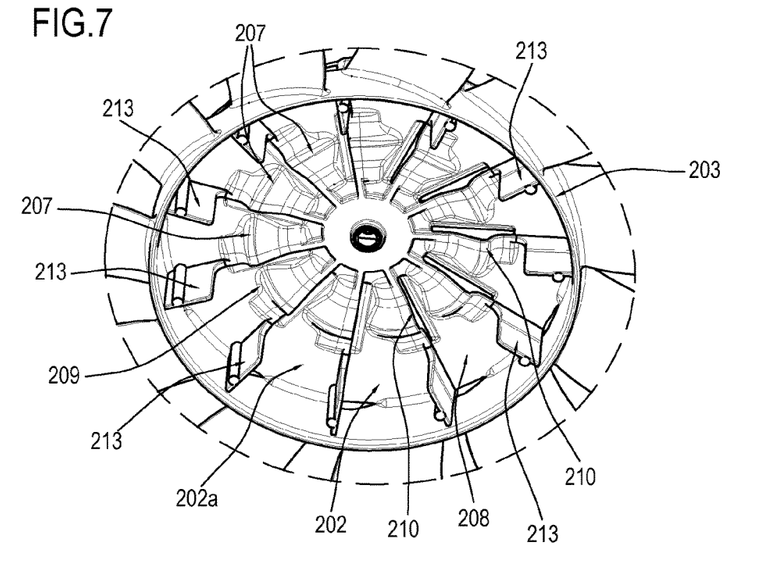
FIG. 7 is a schematic perspective bottom view of the hub of FIG. 6.

Each extractor 207 comprises a concavity facing towards the outside of the cup-shaped structure formed by the hub 201.

In other words, the outer face 202b of the base wall 202 comprises the concavities of the extractors 207.

Each extractor 207 is formed by a curvilinear surface extending from the profile 210 to the corresponding edge 209.

The end profile 210 forms, for each extractor 207, a leading edge of it and is distanced from the main portion 208 of the base wall 202.

At each extractor 207 a corresponding opening 211 is formed between the extractor 207 itself and the main portion 208 of the base wall 202.

In use, the conveying means comprise the openings 211 for putting in fluid communication the inside of the cup-shaped structure and the outside of the hub 201.

The openings 211 are delimited by the profile 210 of the corresponding extractor 207 and by a corresponding edge 212 of the main portion 208 of the base wall 202.

In use, the main portion 208 of the base wall 202 comprises the edges 212 of the openings 211.

The profiles 210 of the aerodynamic appendages 207 are angled, considering the direction V of rotation of the fan 200, like the leading edges 205 of the blades 204.

Advantageously, each profile 210 substantially overlaps, according to a line parallel with the axis R of rotation, the corresponding edge 212.

An infinitesimal deviation of the profile 210 relative to the edge 212 is allowed due to the fact that the fan 200 is moulded.

As illustrated in particular in FIGS. 3, 3a the profiles 210 of the extractors 207 are advantageously inserted, at least partly, in the channel 117.

Preferably, the outline of each profile 210 matches the outline of a corresponding flat section of the channel 117.

Each profile 210 comprises a first section 218 facing the base wall 118 of the channel 117, a second section 219 facing the lateral wall 119 of the channel 117 and a third section 220 facing the lateral wall 120 of the channel 117.

In the preferred embodiment illustrated, the section 219 has a curvilinear profile, whilst the section 220 has a straight profile.

Preferably, the sections 218, 219, 220 of the profile 210 are connected to each other and are equidistant from the corresponding wall 118, 119, 120 of the channel 117.

As illustrated in particular in FIG. 7, the fan 200 comprises a plurality of radial vanes 213 located inside the hub 201.

Preferably, each vane 213 is positioned substantially at the profile 210 of a respective extractor 207.

Each vane extends radially from the lateral wall 203 of the hub 201 towards the axis R of rotation and is sized to rotate about the portion of casing inserted inside the hub 201.

In use, during rotation of the fan 100 in the direction V each extractor 207 "gathers" with its own leading edge 210, the air present in the channel 117 and conveys it out of the cup-shaped structure through the corresponding opening 211 from which the air comes out.

In use, the extractors 207 produce a secondary flow F2 of warm air which combines with the main flow F1 produced by the fan 100.

In that way motor 100 cooling is optimised.

The projection 113 against which the stator winding 112 abuts absorbs heat from the stator 106 and transfers it to the casing 101, in particular into the channel 117.

The fan 200, by means of the extractors 207, extracts heat from inside the hub 201, in particular from the channel 117, and transfers it out of the cup-shaped structure.

The invention claimed is:

1. An electrical machine having an axis of rotation and comprising:
    a casing comprising a casing base wall transverse to said axis of rotation;
    a cap which closes the casing;
    a stator, fixed to said casing, comprising a plurality of pole shoes and a wire wound on said pole shoes to form a plurality of coils forming a stator winding,
    said casing base wall comprising a projection projecting towards an inside of the casing according to a line parallel with said axis of rotation,
    at least one of the plurality of coils engaging said projection for heat exchange with said casing via the projection,
    wherein said casing base wall comprises, on an exterior face of the casing base wall and facing towards an outside of the casing, a first annular channel for discharging heat;
    an axial flow fan rotatable on the axis of rotation, the axial flow fan including:
        a central hub comprising a hub base wall; and
        a fluid conveying system associated with the hub base wall, the fluid conveying system comprising a plurality of fluid extractors attached to the hub base wall and a plurality of corresponding openings in the hub base wall, the plurality of fluid extractors and plurality of corresponding openings positioned axially adjacent the first annular channel for conveying air through the hub base wall and away from the first annular channel to extract heat from the first annular channel.

2. The electrical machine according to claim 1, wherein said projection is substantially annular, with all of the coils engaging with said projection.

3. The electrical machine according to claim 2, wherein said projection delimits, together with a lateral wall of said casing, a second annular channel inside said casing.

4. The electrical machine according to claim 1, wherein said first annular channel is substantially located at said projection and centered with respect to said axis of rotation.

5. The electrical machine according to claim 1, wherein said casing base wall is provided for abutting and facing a hub base wall of a hub of an axial fan.

6. The electrical machine according to claim 1, wherein each of the plurality of coils comprises an end portion engaged with said projection.

7. The electrical machine according to claim 1, and further comprising an electrical insulator interposed between the stator winding and said projection.

8. The electrical machine according to claim 1, wherein the axial flow fan further comprises:
a lateral wall projecting from said hub base wall to form a cup-shaped structure,
a plurality of blades each fixed to the central hub and comprising a leading edge and a trailing edge,
wherein the fluid conveying system is associated with the hub base wall for conveying air from an inside of the cup-shaped structure to an outside of the cup-shaped structure.

9. The electrical machine according to claim 8, wherein said electrical machine comprises a rotor rotatably constrained to said casing and a shaft fixed to said rotor, said shaft comprising a free end protruding from the casing base wall, said fan being fixed to said free end.

10. The electrical machine according to claim 8, wherein said hub base wall comprises a main portion transverse to said axis of rotation, wherein each of the plurality of fluid extractors projects from said main portion towards the inside of said cup-shaped structure and comprising an end edge fixed to said main portion and an end profile distanced from said main portion towards the inside of said cup-shaped structure, said end profile forming a leading edge of said each of the plurality of fluid extractors and being inserted in said first annular channel.

11. The electrical machine according to claim 10, wherein a cross-sectional shape of each end profile matches a cross-sectional shape of a corresponding section of said first annular channel.

12. The electrical machine according to claim 11, wherein said first annular channel comprises a first channel base wall and is laterally delimited by a first lateral wall and by a second lateral wall which are connected to the first channel base wall and wherein each end profile comprises a first section facing the first channel base wall, a second section facing the first lateral wall and a third section facing the second lateral wall.

13. The electrical machine according to claim 12, wherein said first section, said second section, and said third section of said end profile are connected to each other and are at a same distance, respectively, from the first channel base wall, from the first lateral wall and from the second lateral wall.

14. An electrical machine comprising:
an electrical machine having an axis of rotation and comprising:
a casing comprising a casing base wall transverse to said axis of rotation;
a cap which closes the casing;
a stator, fixed to said casing, comprising a plurality of pole shoes and a wire wound on said pole shoes to form a plurality of coils forming a stator winding,
said casing base wall comprising a projection projecting towards an inside of the casing according to a line parallel with said axis of rotation,
at least one of the plurality of coils engaging said projection for heat exchange with said casing via the projection,
wherein said casing base wall comprises, on an exterior face of the casing base wall and facing towards an outside of the casing, a first annular channel for discharging heat;
an axial flow fan rotatable on the axis of rotation and comprising:
a central hub comprising a hub base wall and a lateral wall projecting from said hub base wall to form a cup-shaped structure,
a plurality of blades each fixed to the central hub and comprising a leading edge and a trailing edge,
a fluid conveying system associated with the hub base wall for conveying air from an inside of the cup-shaped structure to an outside of the cup-shaped structure through the hub base wall;
said fluid conveying system acting at said first annular channel and comprising a plurality of fluid extractors and a plurality of corresponding openings in said hub base wall;
wherein the hub base wall comprises a main portion transverse to the axis of rotation, wherein each of the plurality of fluid extractors projects from the main portion towards the inside of the cup-shaped structure and comprising an end edge fixed to the main portion and an end profile distanced from the main portion towards the inside of the cup-shaped structure, the end profile forming a leading edge of the each of the plurality of fluid extractors and being inserted in the first annular channel.

* * * * *